(12) United States Patent
Binkert et al.

(10) Patent No.: US 8,543,005 B2
(45) Date of Patent: Sep. 24, 2013

(54) INTENTIONALLY SKEWED OPTICAL CLOCK SIGNAL DISTRIBUTION

(75) Inventors: Nathan L. Binkert, Redwood City, CA (US); Norman P. Jouppi, Palo Alto, CA (US); Robert S. Schreiber, Palo Alto, CA (US); Jung Ho Ahn, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 413 days.

(21) Appl. No.: 12/990,494

(22) PCT Filed: Apr. 30, 2008

(86) PCT No.: PCT/US2008/005575
§ 371 (c)(1),
(2), (4) Date: Oct. 30, 2010

(87) PCT Pub. No.: WO2009/134223
PCT Pub. Date: Nov. 5, 2009

(65) Prior Publication Data
US 2011/0052204 A1    Mar. 3, 2011

(51) Int. Cl.
*H04B 10/00*    (2013.01)

(52) U.S. Cl.
USPC ........... 398/155; 398/154; 398/158; 398/159; 398/66; 398/33; 398/177; 398/34; 385/24; 385/14; 385/31; 385/129; 370/503; 370/400; 370/535; 375/354; 375/356; 375/260

(58) Field of Classification Search
USPC ............. 398/154, 155, 158, 159, 79, 81, 147, 398/60, 59, 33, 34, 175, 177, 164, 141, 66, 398/68; 385/24, 14, 129, 130, 131, 15, 27, 385/31; 370/503, 400, 535, 389; 375/354, 375/356, 260, 212, 214
See application file for complete search history.

(56) References Cited

U.S. PATENT DOCUMENTS

| | | | |
|---|---|---|---|
| 5,442,475 A * | 8/1995 | Bausman et al. | 398/155 |
| 6,075,832 A | 6/2000 | Geannopoulos et al. | |
| 6,125,217 A | 9/2000 | Paniccia et al. | |
| 7,024,121 B2 * | 4/2006 | Rikitake et al. | 398/154 |
| 7,035,269 B2 | 4/2006 | Rolston et al. | |
| 2004/0130367 A1 | 7/2004 | Swarbrick et al. | |

OTHER PUBLICATIONS

Internaitonal Search Report, PCT/US2008/005575, Nov. 24, 2008, 10 pages.

* cited by examiner

Primary Examiner — Hanh Phan

(57) ABSTRACT

Embodiments of the present invention relate to systems and methods for distributing an intentionally skewed optical-clock signal to nodes of a source synchronous computer system. In one system embodiment, a source synchronous system comprises a waveguide, an optical-system clock optically coupled to the waveguide, and a number of nodes optically coupled to the waveguide. The optical-system clock generates and injects a master optical-clock signal into the waveguide. The master optical-clock signal acquiring a skew as it passes between nodes. Each node extracts a portion of the master optical-clock signal and processes optical signals using the portion of the master optical-clock signal having a different skew for the respective extracting node.

14 Claims, 12 Drawing Sheets

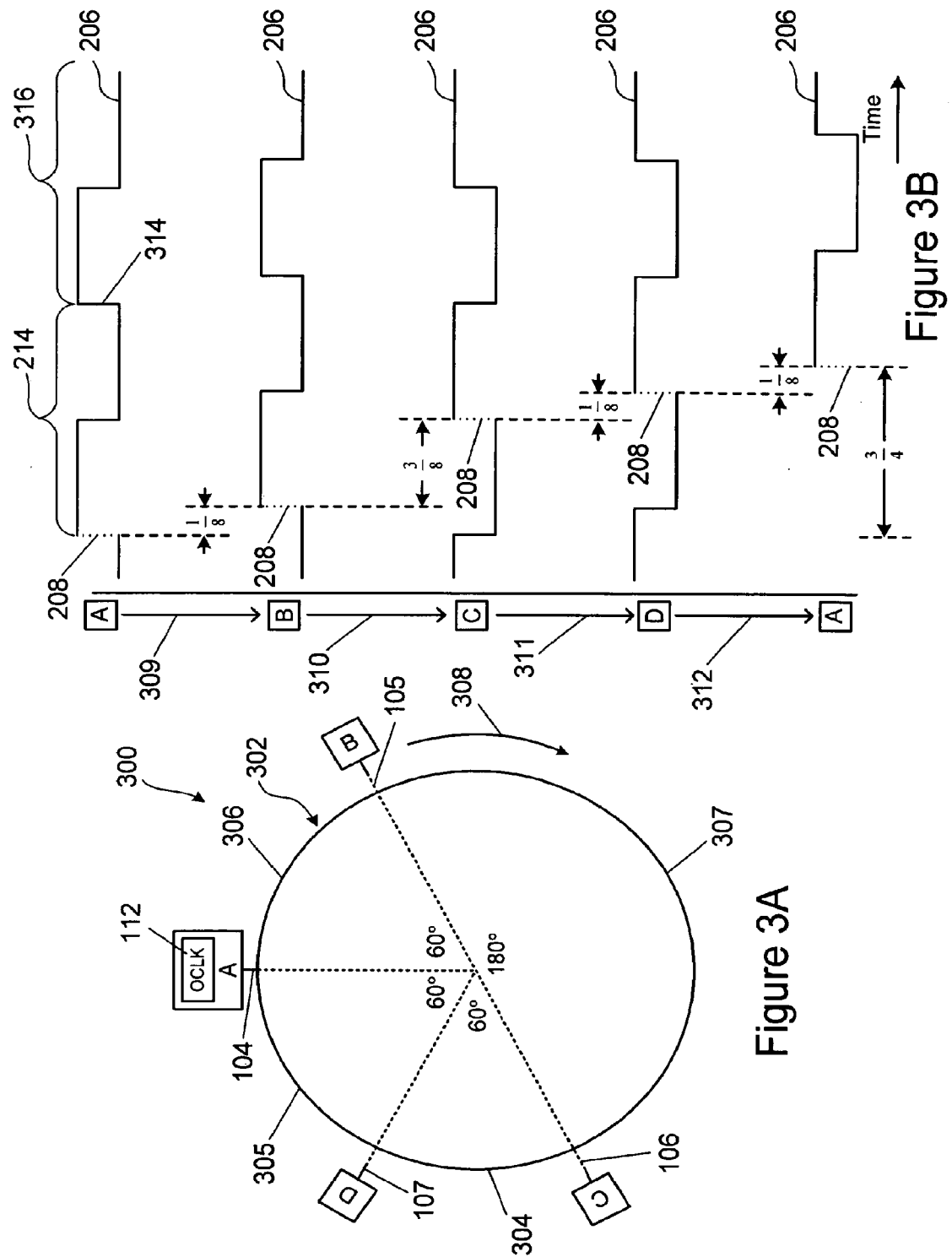

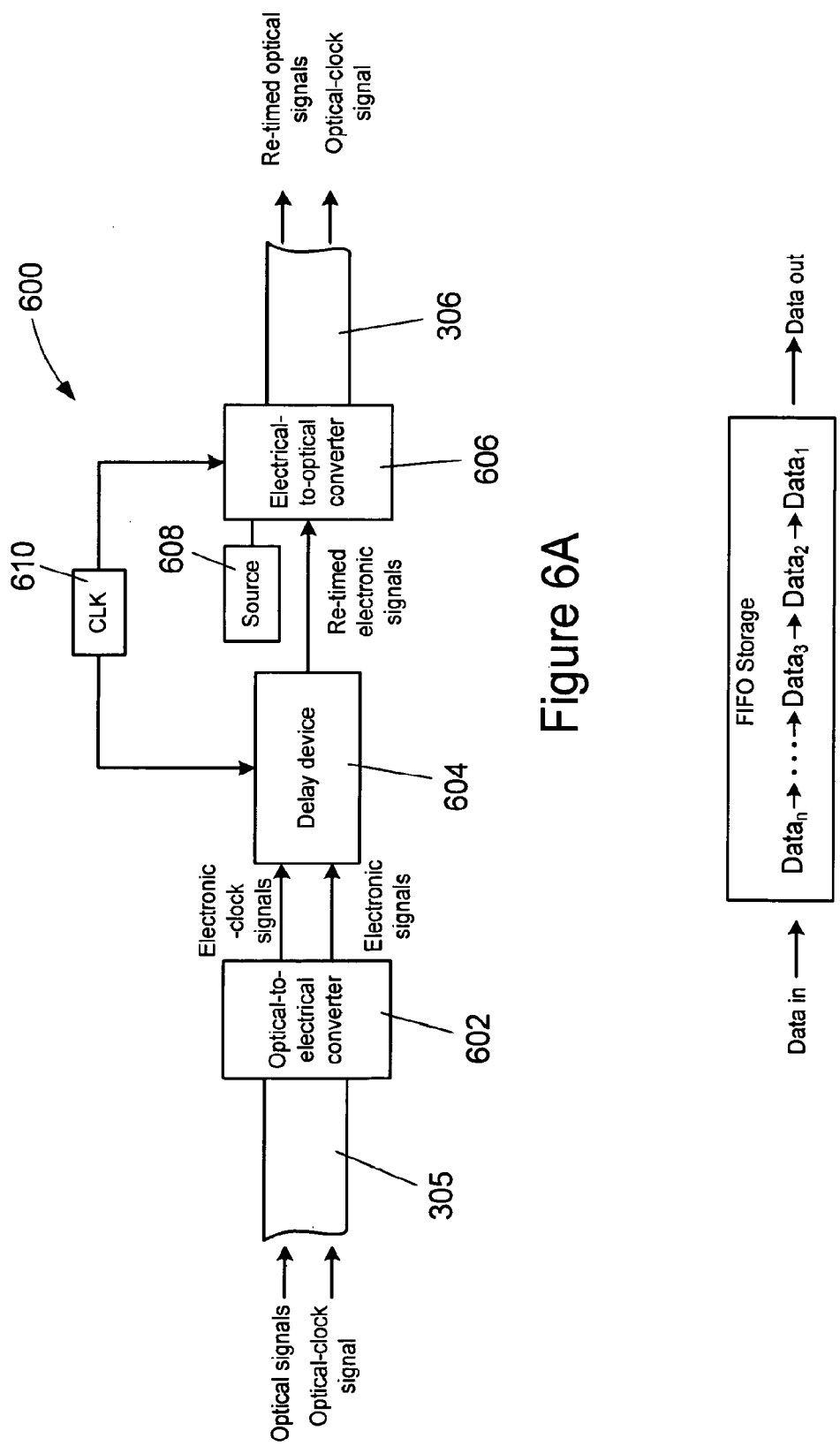

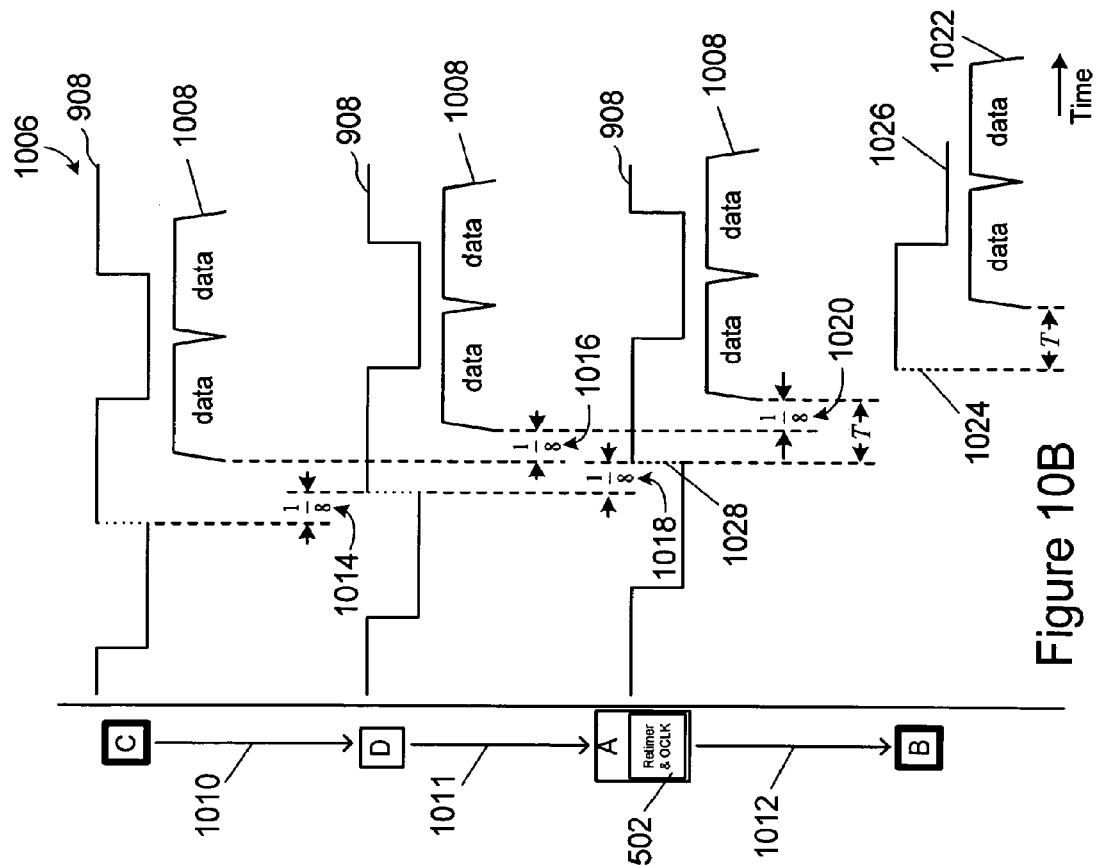
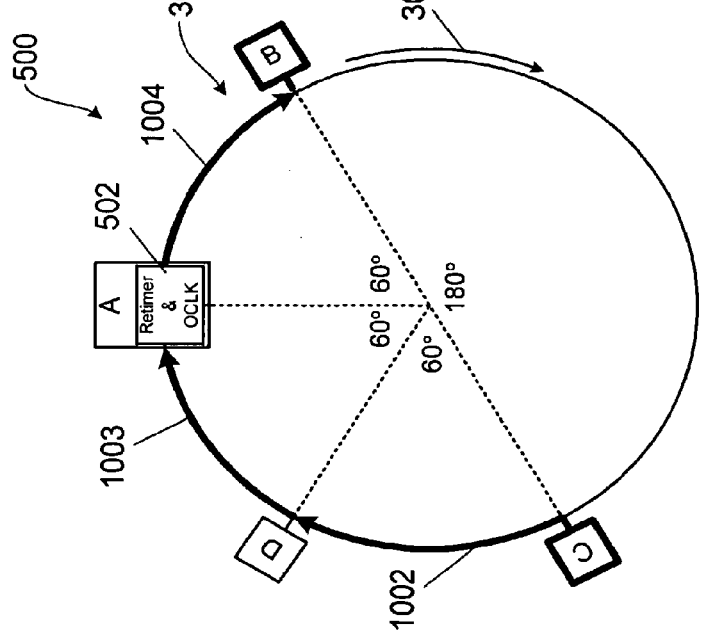
Figure 10B
Figure 10A

INTENTIONALLY SKEWED OPTICAL CLOCK SIGNAL DISTRIBUTION

TECHNICAL FIELD

Embodiments of the present invention relate to optical signals, and, in particular, to methods and systems distributing an optical clock signal.

BACKGROUND

In a synchronous digital system, such as a computer chip, a clock signal is employed to provide a time of reference for the transmission of data within the system. A system clock produces an electronic-clock signal in the form of a steady high-frequency signal that synchronizes the operation of the system components. A clock signal oscillates between distinctive high and low states. The transitions between high and low states create rising and falling clock edges. A clock cycle is a single complete traversal of the clock signal from a rising clock edge through a falling clock edge until the start of the next rising edge.

Clock signals are distributed to, and are used and needed by every end-of-clock-cycle latch and have other uses in synchronous systems. For example, ideally a clock signal is electronically distributed over a computer chip to all chip components so that all components are operating with a clock edge that is minimally skewed or phase shifted with respect to any other clock edge. Thus, synchronous systems employ clock distribution networks, such as an H-tree network, that are designed to distribute the clock signal from the system clock to all the components that use it.

Since components transmit and process data signals with reference to clock edges, the clock edges must be particularly clean and sharp. However, clock signals are vulnerable to technology scaling. For example, relatively long global interconnect lines become significantly more resistive as line dimensions are decreased. Thus a clock signal can be degraded as the dimensions of the lines used to distribute the clock signal decrease and the clock edges can become less distinct. The clock distribution network also takes a significant fraction of the total power consumed by the synchronous system.

In order to handle the global distribution of clock signals on a chip, there are currently two alternatives. One way to deal with the problem is to latch data signals to the clock signal at intervals that are shorter than the distance the data signal travels in one clock cycle so that the data signal is always kept in time with the clock. Alternatively, data signals can be sent with a forwarded clock which is retimed at each destination by feeding data through an asynchronous first-in, first-out ("FIFO") device, which is timed at one end by the forwarded clock and at the other end by the destination's clock. However, both of these solutions increase latency of transmission, require extra power, and use a relatively large chip surface area.

Engineers have recognized a need for systems and methods that can compensate for clock skew and provide lower latency and less power consumption than currently available solutions.

SUMMARY

Embodiments of the present invention relate to systems and methods for distributing an intentionally skewed optical-clock signal to nodes of a source synchronous computer system. In one system embodiment, a source synchronous system comprises a waveguide, an optical-system clock optically coupled to the waveguide, and a number of nodes optically coupled to the waveguide. The optical-system clock generates and injects a master optical-clock signal into the waveguide. The master optical-clock signal acquiring a skew as it passes between nodes. Each node extracts a portion of the master optical-clock signal and processes optical data signals using the portion of the master optical-clock signal having a different skew for the respective extracting node.

In one method embodiment, optical signals are processed using a skewed optical-clock signal in a source synchronous computer system. The method includes generating a master optical-clock signal and injecting the master optical-clock signal into a waveguide. The method also includes extracting a portion of the master optical-clock signal at each node optically coupled to the waveguide, the portion of the master optical-clock signal having a different skew at each node, and processing the optical data signals using the portion of the master optical-clock signal having a different skew for the respective extracting node.

BRIEF DESCRIPTION OF THE DRAWINGS

FIG. 3A shows a schematic representation of a second source synchronous system configured in accordance with embodiments of the present invention.

FIG. 3B shows an example timing diagram of an optical-clock signal as it passes each node of the source synchronous system, shown in FIG. 3A.

FIG. 6A shows a schematic representation of a first retimer configured in accordance with embodiments of the present invention.

FIG. 6B shows a schematic representation of data stored in a queue of a FIFO storage system in accordance with embodiments of the present invention.

FIG. 10A shows a second example transmission of information over a waveguide of the source synchronous system, shown in FIG. 5A, in accordance with embodiments of the present invention.

FIG. 10B shows a timing diagram of an optical-clock signal and an optical signal traveling between nodes of the source synchronous system, shown in FIG. 10A, in accordance with embodiments of the present invention.

DETAILED DESCRIPTION

Embodiments of the present invention relate to systems and methods for distributing an intentionally skewed optical-clock signal to nodes of a source synchronous computer system. For the sake of brevity and simplicity, system and method embodiments are described below with reference to four nodes optically coupled to a waveguide. However, embodiments of the present invention are not intended to be so limited. Those skilled in the art will immediately recognize that these systems and methods can be readily scaled up to provide optical-clock signal distribution in systems composed of multiple nodes.

I. Distribution of an Intentionally Skewed Optical-Clock Signal

Figure 1:
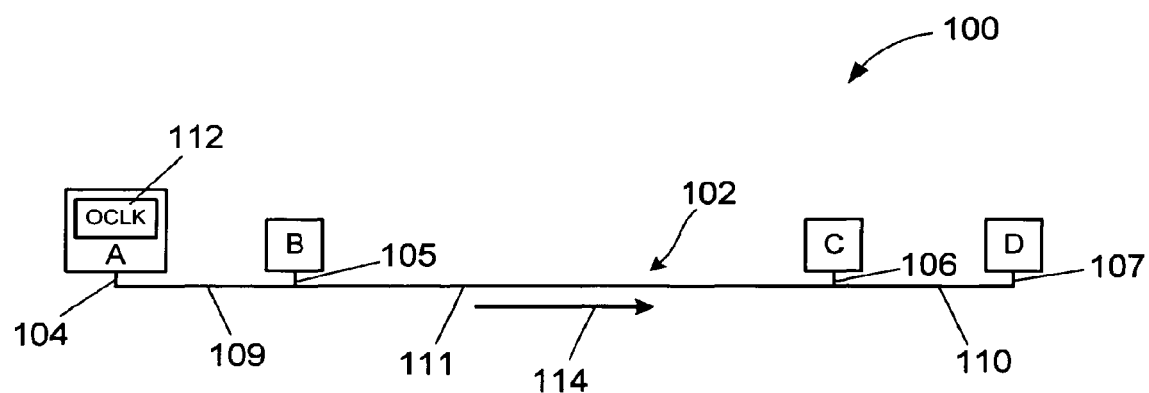
FIG. 1 shows a schematic representation of a first source synchronous system using a master optical-clock signal which acquires skew as it passes between nodes of the system configured in accordance with embodiments of the present invention.

FIG. 1 shows a schematic representation of a source synchronous computer system 100 configured in accordance with embodiments of the present invention. The system 100 is composed of a waveguide 102 and four nodes labeled A-D that are optically coupled to the waveguide 102 via converters 104-107. The nodes can be any combination of processors, memory controllers, servers, clusters of multi-core processing units, circuit boards, external network connections, or any other data processing, storing, or transmitting device. The system 100 can be implemented on a single chip, such as a multicore chip, or the nodes can be separate components of a synchronous network. The waveguide can be an optical fiber or ridge waveguide implemented on a single substrate. In the example illustrated in FIG. 1, the length of waveguide segments 109 and 110 are approximately equal, and the length of the waveguide segment 111 is three times longer than the segments 109 and 110. In FIG. 1, the distances between nodes along the waveguide 102 are selected for the sake of simplicity in describing embodiments of the present invention. In practice, the distance between nodes can vary without limitation.

Figure 2A:
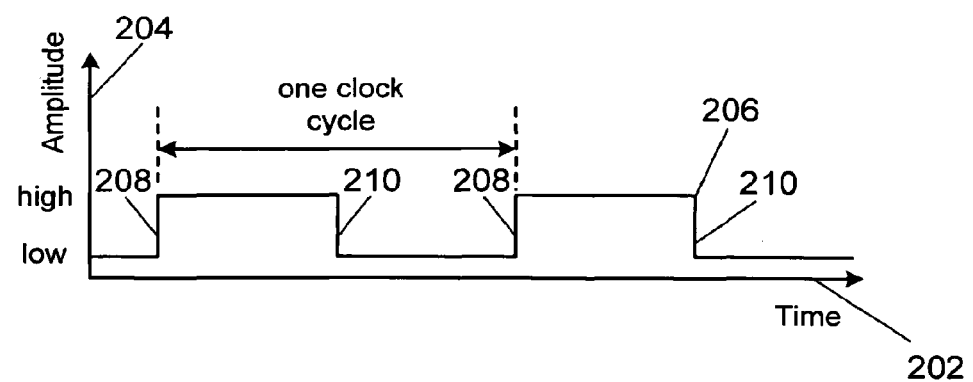
FIG. 2A shows a plot of two clock cycles of an optical-clock signal.

Node A includes an optical-system clock 112 that generates a master optical-clock signal that is broadcast to nodes B-D by injecting the optical-clock signal into the waveguide 102 in the direction represented by directional arrow 114. FIG. 2A shows a plot of two clock cycles of an optical-clock signal. Horizontal axis 202 represents time, vertical axis 204 represents amplitude, and square wave 206 represents two clock cycles of an optical-clock signal. The optical-clock signal 206 oscillates between distinctive high and low amplitudes and has the form of a square wave pulse train. Transitions between high and low amplitudes correspond to distinct rising clock edges 208 and falling clock edges 210. One complete clock cycle is a complete traversal of the optical-clock signal from a rising clock edge 208 through a falling clock edge 210 until the start of the next rising clock edge of a subsequent clock cycle. The period of a clock cycle is the time needed to complete one clock cycle.

Optical signals generated by the nodes and the optical-clock signal can be simultaneously transmitted on the waveguide 102 in the direction 114. Each of the converters 104-107 includes an optical-to-electrical ("OE") converter (not shown) that extracts a portion of the optical-clock signal passing each node and extracts optical signals destined for a particular node and converts the optical-clock signal into an electronic-clock signal that can be used by each node to synchronize the internal operation of each node and converts the optical signals into electronic signals that can be processed by nodes A-D. The converters 104-107 can also include electrical-to-optical ("EO") converters (not shown). The EO converters convert information encoded in electronic signals generated by nodes A-D into optical signals that are injected into the waveguide 102 so that nodes A-D can also use the waveguide 102 to transmit information to one another. In other embodiments, a separate waveguide following substantially the same path as the waveguide 102 can be employed to transmit the optical signals alone while the optical-clock signal is transmitted on the waveguide 102. In other embodiments, the optical-clock signal can be composed of multiple wavelengths, where each wavelength is assigned to a particular node. For example, the optical-clock signal used with the system 100 can be composed of four distinct wavelengths, and each of the converters 104-107 can be configured to extract one of the four wavelengths from the waveguide 102.

Figure 2B:
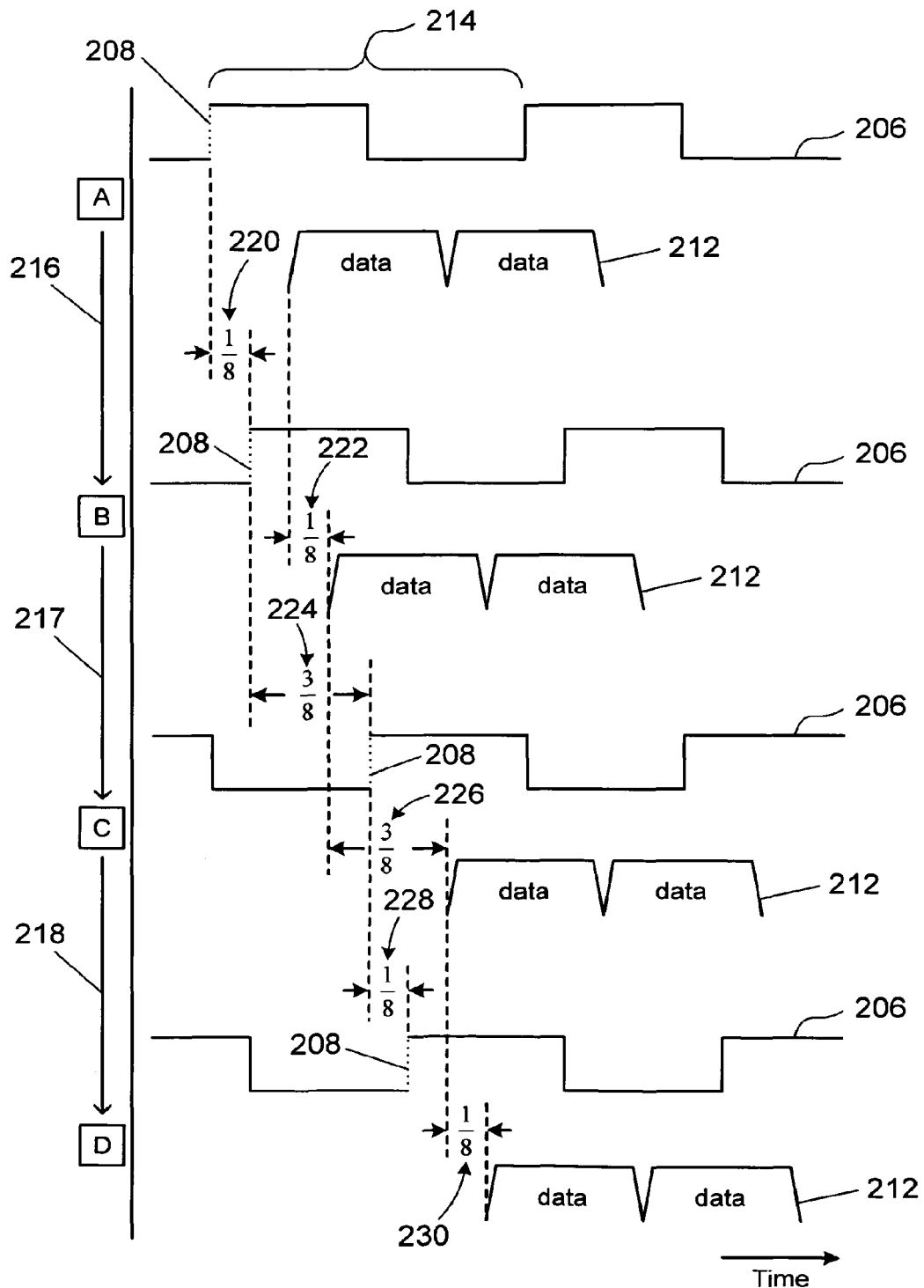
FIG. 2B shows a timing diagram of an optical-clock signal and an optical signal of the source synchronous system, shown in FIG. 1A, in accordance with embodiments of the present invention.

Consider an example transmission of optical signals over the waveguide 102 from node A to node D. FIG. 2B shows a timing diagram of the optical-clock signal 206 and an optical signal 212 generated by node A carrying data in accordance with embodiments of the present invention. Rising clock edge 208 of a clock cycle 214 is represented by a dotted-line segment and is used as a reference point to identify the phase shift or skew the optical-clock signal 206 acquires as it passes between nodes. Directional arrows 216-218 correspond to the segment 109, 111, and 110 between nodes A-D. Assuming that it takes the rising clock edge 208 ⅛ of a clock cycle to travel the length of the segment 109, the timing diagram reveals that the clock edge 208 acquires the same skew as the optical-clock signal 206 at each node. In particular, the optical-clock signal 206 and the optical signal 212 acquire skews of ⅛ of a clock cycle 220 and 222, respectively, in traveling from node A to node B, acquire skews of ⅜ of a clock cycle 224 and 226, respectively, in traveling from node B to node C, and acquire skews of ⅛ of a clock cycle 228 and 230, respectively, in traveling from node C to node D.

The optical-clock signal functions as a master clock signal. Each node extracts a portion of the optical-clock signal as it passes and generates a low-skew, local electronic-clock signal for internal use. The internal electronic clock and logical operations of each node are independently synchronized with the rising and/or falling edges of the extracted clock cycles of the master optical-clock signal. As a result, the internal operations of the nodes are skewed relative to one another by the amount of skew acquired by the optical-clock signal traveling on the waveguide 102. For example, the logical operations of node C occur independently of the logical operations of node B and, as shown in FIG. 2B, because the clock cycle arrives at node C ⅜ of a clock cycle after it arrives at node B, node C's electronic clock is set and logical operations occur at approximately ⅜ of a clock cycle after node B. When a node is in need of sending optical signals to another node, the sending node can transmit the optical signal using its own clock across the waveguide 102 or, in other embodiments, a second waveguide following the same path as the waveguide 102 can be used to carry the optical signals and have equivalent delay. Since the path length of the optical signals is substantially the same as the path length of the optical-clock signal, the optical signals are skewed by the same amount as the optical clock signal and the receiving node can receive the optical signals and the optical clock signal without any need for re-timing.

II. Asynchronization Arising in a Closed-Loop Waveguide

Although the nodes of the system 100 can operate independently with the optical-clock signal, nodes can only transmit information to other nodes that are located downstream of the direction 114 in which optical signals travel on the waveguide 102 and nodes can only receive optical signals from nodes that are located upstream of the direction 114 in which optical signals travel on the waveguide 102. For example, node A can send optical signals to nodes C-D, but nodes C-D cannot send optical signals to node A. This can be corrected by reconfiguring the waveguide in the form of a loop so that each node can communicate with another node on the waveguide. The examples below illustrate a closed-loop but other loop configurations in which each node can communicate with another node are suitable as well.

FIG. 3A shows a schematic representation of a source synchronous system 300 configured in accordance with embodiments of the present invention. The system 300 is composed of a closed-loop waveguide 302 with nodes A-D optically coupled to the waveguide 302 via converters 104-107. In this case, the length of waveguide segments 304-306 are approximately ⅙ of the total length of the waveguide 302, and the length of the waveguide segment 307 is three times longer than the segments 304-306 and is approximately ½ of the total length of the waveguide 302. The optical-clock signal and the optical signals are transmitted in the clockwise direction 308. The distances between nodes around the waveguide 302 are selected for the sake of simplicity in describing embodiments of the present invention. In practice, the distance between nodes can vary without limitation. However, a closed-loop waveguide of arbitrary length can introduce a number of timing problems at the nodes as follows.

FIG. 3B shows an example timing diagram of the optical-clock signal 206 as it passes each of the nodes A-D along the waveguide 302. Directional arrows 309-312 correspond to the path the optical-clock signal 206 takes around the waveguide 302 starting at node A finally returning to node A. The timing diagram reveals that the clock edge 208 travels from node A to node B in ⅛ of a clock cycle, from node B to node C in ⅜ of a clock cycle, from node C to node D in ⅛ of a clock cycle, and from node D back to node A in ⅛ of a clock cycle. The timing diagram also reveals that the total time it takes for the clock edge 208 to complete one trip around the waveguide 302 is ¾ of a full clock cycle, and that a clock edge 314 of the subsequent clock cycle 316 reaches node A at ¼ of a clock cycle after the clock edge 208 returns to node A. A second type of synchronization problem arises when a previous clock cycle arrives at a node just after the new clock cycle arrives at a node.

In either case, the nodes A-D are not able to function in lock step with the arrival of each clock cycle because while a first clock cycle is being extracted by a node from the waveguide, the same node can start to extract a second out-of-phase clock cycle still traveling on the waveguide 302 before the extraction of the first is complete. Because the operation of flip-flops and opening and closing of latches of each node are dependent on the arrival of rising and/or falling edges of each clock cycle, the logical operations of each node are not synchronized with the corresponding skew in the master optical-clock signal. As a result, optical signals transmitted on the waveguide 302, or in a separate waveguide, are not processed by the nodes in accordance with the master optical-clock signal passing the nodes.

III. Configuring the Length of the Waveguide

Synchronization problems can be ideally handled by configuring the length of the waveguide as a whole integer multiple of the period of the clock cycle as follows:

$$L = m\frac{c}{n}T_{CLK}$$

where L is the length of the waveguide, m is a whole number, c is the speed of light in free space, n is the refractive index of the waveguide, and $T_{CLK}$ is the period or time needed to complete one clock cycle of the optical-clock signal. As a result, the phase difference between any previous clock cycle remaining on the waveguide 302 and newly introduced clock cycle is substantially zero.

Figures 4A, 4B:
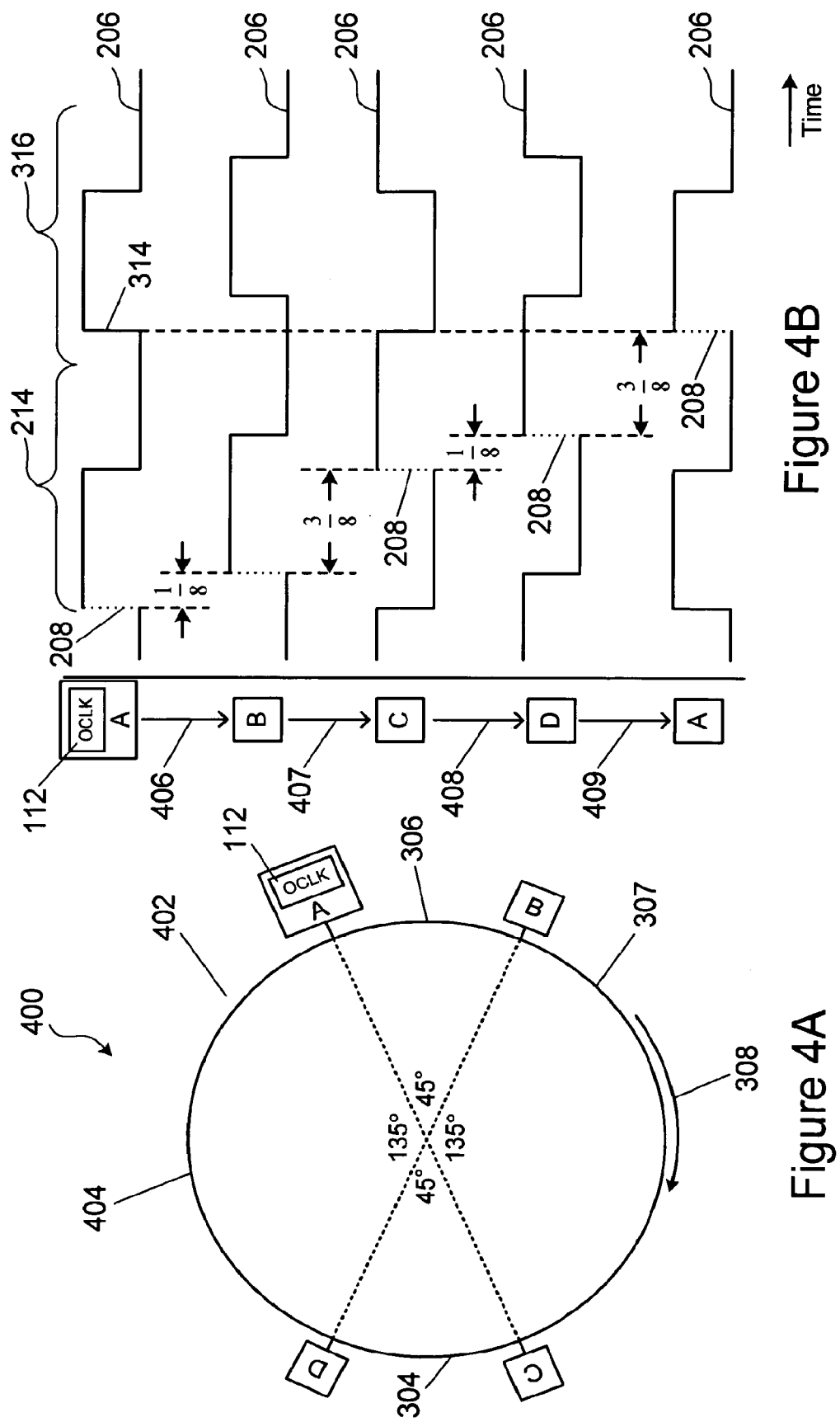
FIG. 4A shows a schematic representation of a third source synchronous system configured in accordance with embodiments of the present invention.
FIG. 4B shows an example timing diagram of an optical-clock signal as it passes each node of the source synchronous system, shown in FIG. 4A, in accordance with embodiments of the present invention.

FIG. 4A shows a schematic representation of a source synchronous system 400 configured in accordance with embodiments of the present invention. The system 400 is nearly identical to the system 300, shown in FIG. 3, except the segment 305 has been replaced by a segment 404 that is three times longer than the segment 305.

FIG. 4B shows an example timing diagram of an optical-clock signal as it passes each node of the source synchronous system, shown in FIG. 4A, in accordance with embodiments of the present invention. Directional arrows 406-409 correspond to the segments 306, 307, 304, and 404, respectively, of the waveguide 402 that the optical-clock signal 206 travels along starting at node A and finally returning to node A. As shown in FIG. 4B, the skew acquired by the optical-clock signal 206 traveling from node A to node D is unchanged, however, unlike the segment 305 of the system 300, FIG. 4B reveals that the clock edge 208 travels from node D to node A in ⅜ of a clock cycle over segment 404, which places an appropriate skew on the optical-clock signal 206 so that the rising clock edge 208 reaches node A when the rising clock edge 314 of the subsequent clock cycle 316 also reaches node A. Thus, clock cycles of the optical-clock signal 206 returning to node A are substantially in phase with clock cycles of the optical-clock signal 206 originating at node A.

IV. Introducing a Retimer

In certain cases in may not be possible to configure the closed-loop waveguide 302 with a length that is substantially equal to a whole integer multiple of the period of a clock cycle of the master optical-clock signal. In these cases, a retimer can be disposed on the waveguide 302 to introduce an appropriate time delay in the transmission of the optical signals.

Figure 5A:
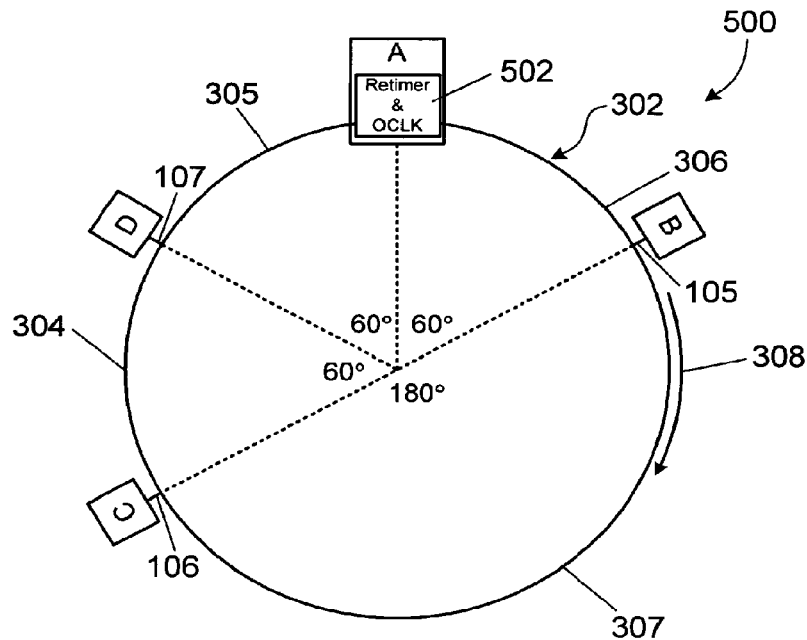
FIG. 5A shows a schematic representation of a fourth source synchronous system configured in accordance with embodiments of the present invention.

FIG. 5A shows a schematic representation of a source synchronous system 500 configured in accordance with embodiments of the present invention. The system 500 is identical to the system 300 except a retimer 502 is included at node A. The retimer 502 is used to introduce a time delay in the optical signals transmitted on the waveguide 302. In other embodiments, the retimer 502 can be located at any node or the retimer 502 can be a separate device disposed anywhere along the waveguide 302. In other embodiments, the optical-system clock can be separate from the retimer and used to generate the optical-clock signal.

Figure 5B:
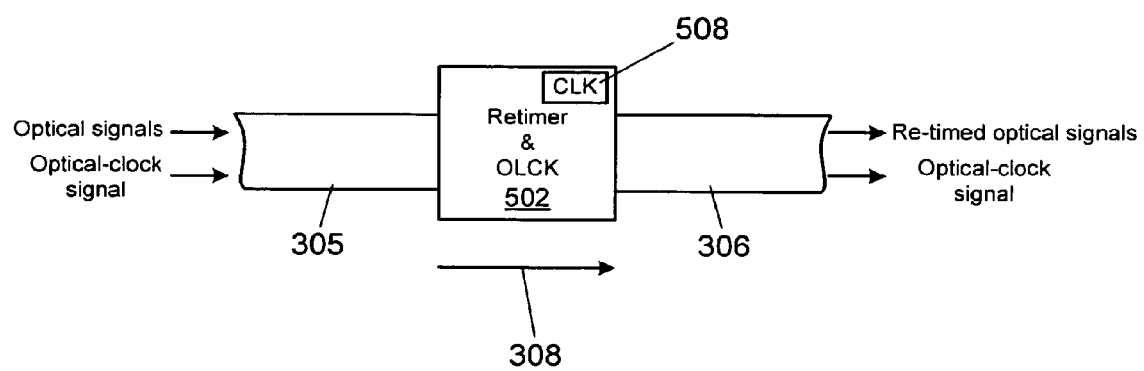
FIG. 5B shows a schematic representation of a retimer of the source synchronous system, shown in FIG. 5A, in accordance with embodiments of the present invention.

FIG. 5B shows a schematic representation of the retimer 502 disposed between and optically coupled to two portions 305 and 306 of the waveguide 302 in accordance with embodiments of the present invention. The retimer 502 also includes an electronic-system clock 508 that generates an electronic-clock signal. The retimer 502 employs the electronic-clock signal to generate an optical-clock signal with substantially the same clock cycle period as the electronic-clock cycle and is output on the portion 306. The optical-clock signal travels in the waveguide 302 in the clockwise direction 308 along with optical signals generated by nodes A-D and returns to the retimer 502 in portion 305. The retimer 502 extracts both the optical-clock signal and the optical signals from the waveguide 302 and determines the relative phase difference between a clock cycle of the optical-clock signal returning to the retimer 502 and a clock cycle of the electronic-clock signal generated by the electronic-system clock 508. This phase difference is used by the retimer 502 to generate time delayed or re-timed optical signals that are placed on the portion 306 in the direction 308. The re-timed optical signals pass each node on the waveguide 302 with the same skew as the master optical-clock signal generated by the retimer 502. In other words, the re-timed optical signals are skewed by the same amount as the optical-clock signal, and any receiving node can receive the re-timed optical signals and the optical-clock signal without any need for re-timing.

FIG. 6A shows a schematic representation of a retimer 600 configured in accordance with embodiments of the present invention. The retimer 600 includes an OE converter 602, a delay device 604, an EO converter 606, a light source 608, and an electronic-system clock 610. A first portion 305 of the waveguide 302 is optically coupled to the OE converter 602, which is electronically coupled to the delay device 604. The EO converter 606 is also electronically coupled to the delay device 604 and is optically coupled to a second portion 306 of the waveguide 302. Electronic-system clock 610 is in electrical communication with the delay device 604 and the EO converter 606. Source 608 can be configured to generate multiple wavelengths of light, for example continuous-wave ("cw") light. EO converter 606 receives electronic-clock signals from the electronic-system clock 610 and light from the source 608 to generate optical-clock signals that are output on portion 306.

Figure 7:
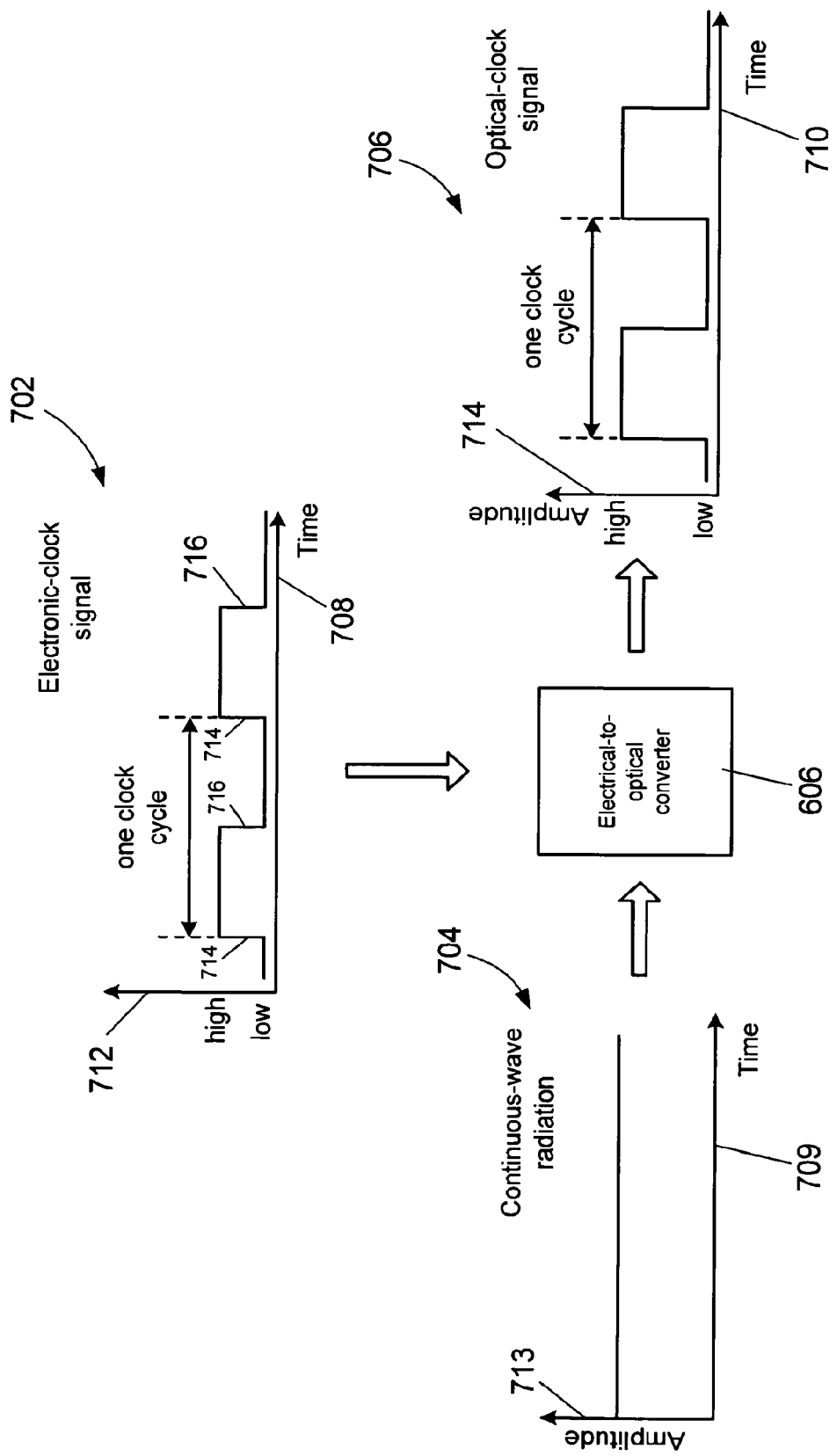
FIG. 7 shows plots of an electronic-clock signal and light input to an electrical-to-optical converter, shown in FIG. 6, to produce an optical-clock signal in accordance with embodiments of the present invention.

FIG. 7 shows plots of an electronic-clock signal 702 and light 704 input to the EO converter 606 to produce an optical-clock signal 706 in accordance with embodiments of the present invention. Horizontal axes 708-710 represents time, vertical axis 712 represents electronic signal amplitude, and vertical axes 713-714 represent optical signal amplitude. The electronic-clock signal plot 702 is composed of two clock cycles oscillating between distinctive high and low amplitudes and has the form of a square wave pulse train. The period of a clock cycle is the time needed to complete one clock cycle and is denoted by $T_{CLK}$. The light (for example, continuous wave (cw) light radiation) plot 704 represents the substantially constant amplitude of the light generated by the source 608. The EO converter 606 includes a modulator (not shown) that receives the light and the electronic-clock signal and modulates the amplitude of the light in accordance with the oscillating amplitude of the electronic-clock signal to generate the optical-clock signal shown in the optical-clock signal plot 706. In one example, the modulator can be operating like a shutter that allows radiation to pass when the amplitude of the electronic-clock signal is high and does not allow radiation to pass when the amplitude is low. The resulting optical-clock signal has substantially the same clock-cycle period $T_{CLK}$. In other embodiments, the EO converter 606 can be configured to use the electronic-clock signal as a modulated source of power for the source 608. The optical-clock signal 706 can be generated by turning the source 608 "on" and "off" in accordance with the high and low amplitude of the electronic-clock signal.

Returning to FIG. 6A, optical signals and an optical-clock signal already traveling on the waveguide 302 enter the retimer 600 through the OE converter 602, which converts the optical signals and the optical-clock signal into electronic signals and an electronic-clock signal, respectively. The electronic signals and the electronic-clock signal are then transmitted to the delay device 604. The delay device 604 also receives the electronic-clock signal generated by the electronic clock 610 and determines the relative phase difference between the electronic-clock cycle output from the OE converter 602 and the electronic-clock cycle generated by the electronic clock 610. The delay device 604 can determine the amount of time delay to apply to the electronic signals as follows:

$$T_{delay} = n \cdot T_{CLK} - T_{return}$$

where $T_{CLK}$ is the period of one complete clock cycle, $T_{return}$ which is the time for one clock cycle to complete a trip around the waveguide 302 and return to the point at which the clock cycle was injected, and n is an integer that satisfies the condition:

$$0 \leq (n \cdot T_{CLK} - T_{return}) \leq T_{return}$$

The delay device 604 then delays the electronic signals by $T_{delay}$ to obtain re-timed electronic signals. In certain embodiments, this can be accomplished by storing and releasing the electronic signals in a first-in, first-out ("FIFO") manner. FIG. 6B shows a schematic representation of data stored in a queue of a FIFO storage system in accordance with embodiments of the present invention. In the example of FIG. 6B, each piece of data includes an integer subscript indicating the order in which the piece of data entered the queue. Each piece of data is stored sequentially in a queue in which the first piece of data added to the queue is the first piece of data removed. In other words, data that has been stored in the queue the longest is the first to be released. The FIFO storage can be SRAM, flip-flops, latches or any other suitable form of storage. In other embodiments, queuing a releasing data in a FIFO manner can be accomplished by employing a delay-locked loop ("DLL"). A DLL phase shifts input electronic signals by a proper amount to remove the phase difference. In other words, the DLL incorporates a tunable delay line and calculates the phase difference between the electronic-clock cycle output from the OE converter 602 and the electronic-clock signal generated by the electronic clock 610 and generates the appropriate time delay $T_{delay}$. The re-timed electronic signals are then transmitted to EO converter 606 which modulates light output from the source 608 to obtain re-timed optical signals that are output on portion 306, as described above with reference to FIG. 5A. In other embodiments, the EO converter 606 can employ the re-timed electronic signals as a modulated source of power that turns the light source 608 "on" and "off" in accordance with the high and low amplitude of the re-timed electronic signals to generate corresponding re-timed optical signals that are output on portion 306 of waveguide 302

Figure 8:
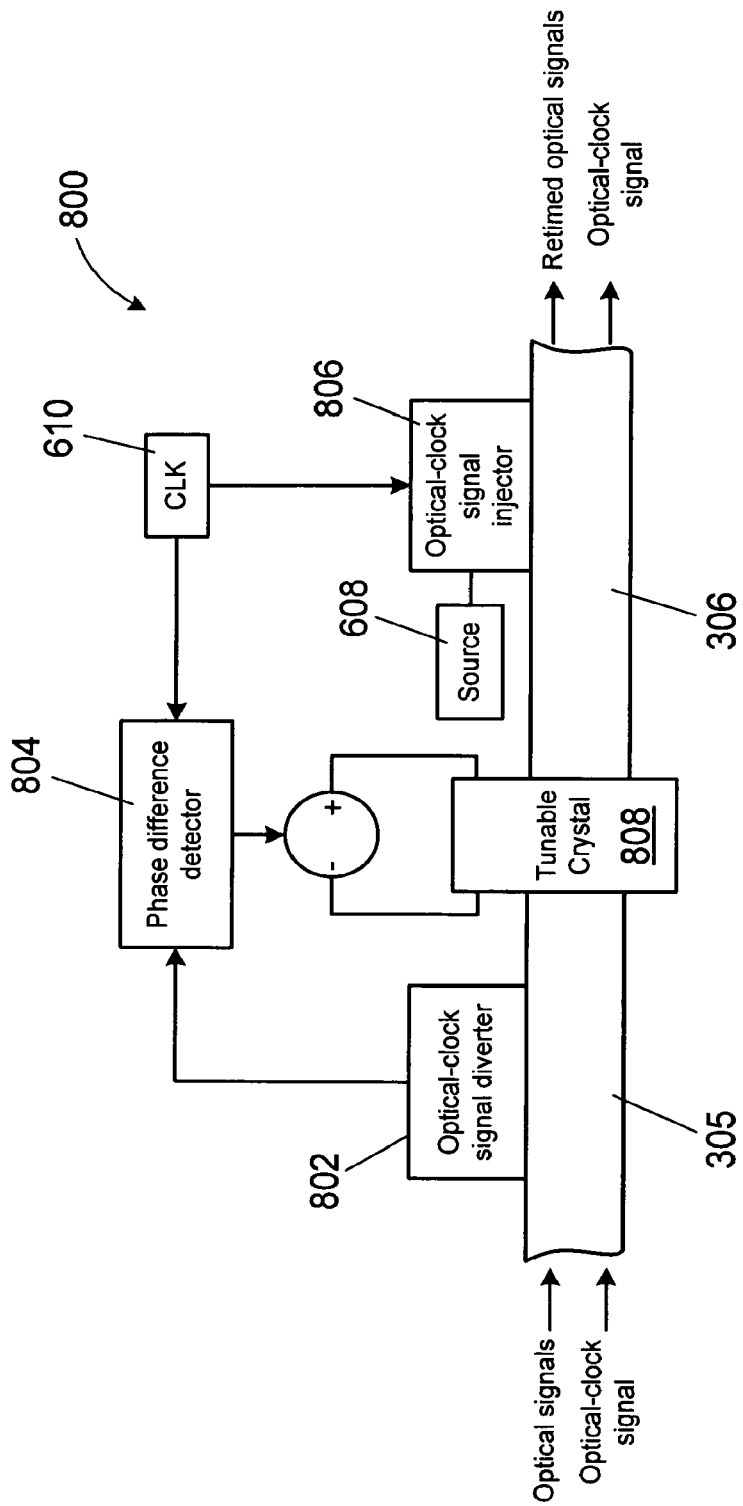
FIG. 8 shows a schematic representation of a second retimer configured in accordance with embodiments of the present invention.

FIG. 8 shows a schematic representation of a second retimer 800 configured in accordance with embodiments of the present invention. The retimer 800 includes an optical-clock signal diverter 802, a phase-difference detector 804, an optical-clock signal injector 806, the light source 608, the electronic clock 610, a tunable crystal 808, and voltage source 810. The first portion 305 of the waveguide 302 is optically coupled to the diverter 802, which is electronically coupled to the phase-difference detector 804. The injector 806 is also electronically coupled to the phase-difference detector 804 and optically coupled to a second portion 306 of the waveguide 302. The tunable crystal 808 is disposed between the portion 305 and the portion 306 and in electronically coupled to the voltage source 810, which, in turn, is electronically coupled to the phase-difference detector 804. The diverter 802 and the injector 806 can be composed of resonators, such as microring resonators or photonic crystal resonators. The light source 608 transmits light to the injector 806 and the clock 610 transmits a portion of the electronic-clock signal to the injector 806. The electronic-clock signal is applied to the resonators of the injector 806 to correspondingly switch the resonance state of the resonators and inject a modulated optical-clock signal into the portion 306 of the waveguide 302 that travels around the waveguide 302, as described above with reference to FIG. 3A. The diverter 802 then exacts the optical-clock signal from the portion 305 and converts the optical-clock signal into an electronic-clock signal that is transmitted to the phase-difference detector 804. The phase-difference detector 804 determines the phase difference between the electronic-clock signal supplied by the electronic clock 610 and the electronic-clock signal converted from the optical clock signal extracted by the diverter 802 and directs the voltage source 810 to apply an appropriate voltage to the tunable crystal 808. The crystal 808 can be composed of a non-opaque variable refractive index material. The refractive index can be varied between two or more different indices of refraction under an appropriate electrical stimulus provided by the voltage source 808. The refractive index of the crystal can be varied to place an appropriate phase shift in the optical signals transmitted along the waveguide 302 to produce re-timed optical signals that are output to the portion 306 of the waveguide 302.

Figure 9B:
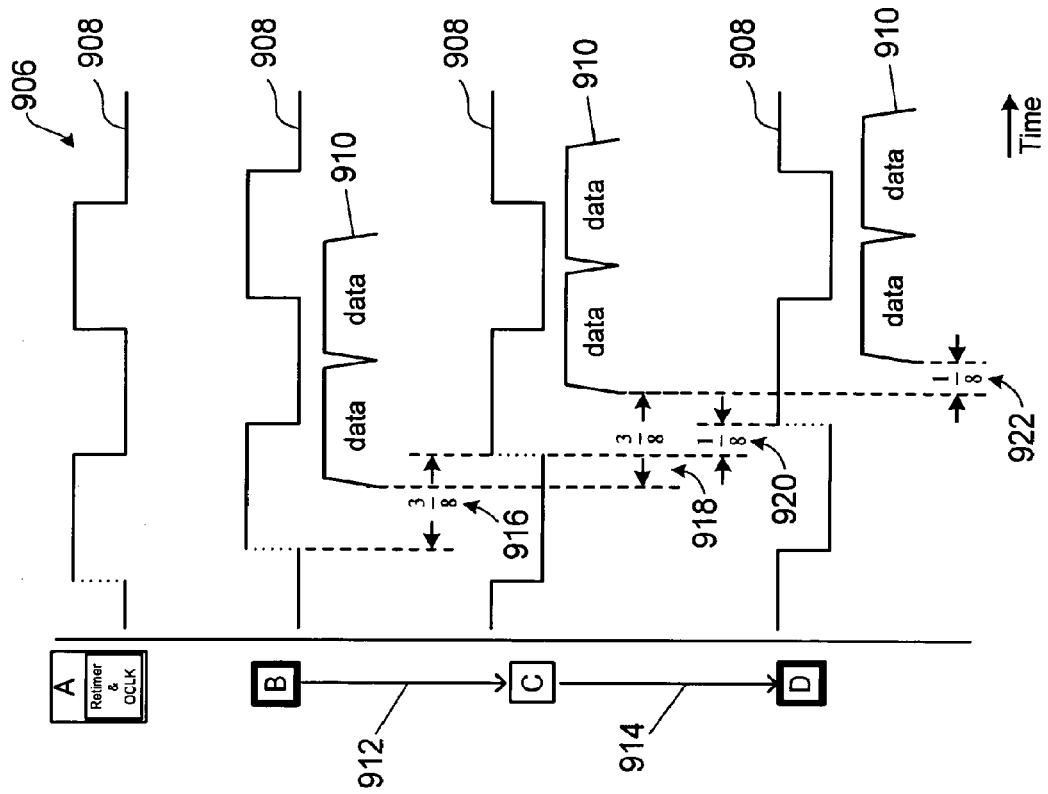
FIG. 9B shows a timing diagram of an optical-clock signal and an optical signal traveling between nodes of the source synchronous system, shown in FIG. 9A, in accordance with embodiments of the present invention.
Figure 9A:
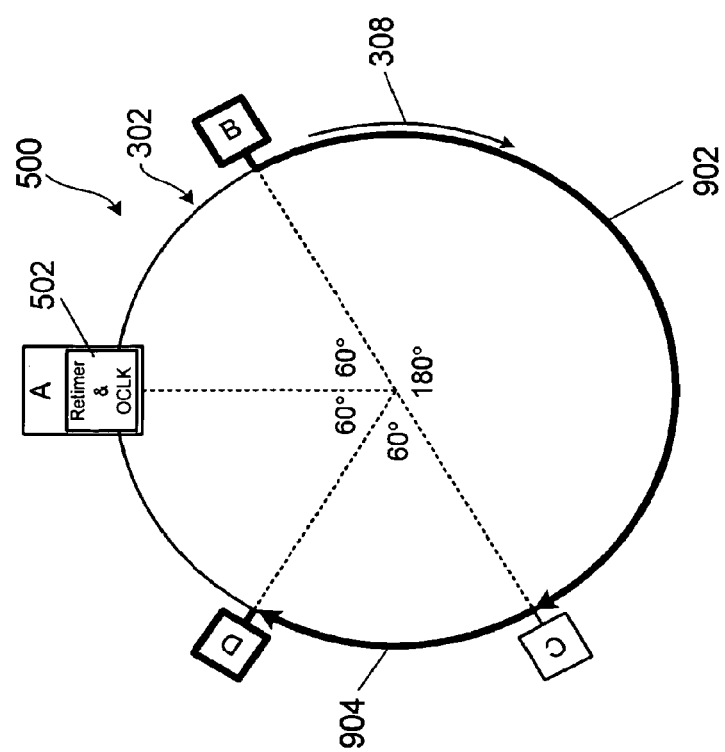
FIG. 9A shows a first example transmission of information over a waveguide of the source synchronous system, shown in FIG. 5A, in accordance with embodiments of the present invention.

FIG. 9A shows an example transmission of information over the waveguide 302 of the system 500 from node B to node D in accordance with embodiments of the present invention. Directional arrows 902 and 904 identify the path of optical signals generated by node B and transmitted along the waveguide 302 to node D. FIG. 9B shows a timing diagram 906 of an optical-clock signal 908 generated by the retimer and an optical signal 910 generated by node B. Directional arrows 912 and 914 correspond to paths 902 and 904, respectively. The timing diagram 906 reveals that the optical signal 910 acquires the same skew as the optical-clock signal 908 when they reach nodes C and D. In particular, the optical-clock signal 908 and the optical signal 910 acquire skews of ⅜ of a clock cycle 916 and 918, respectively, in traveling from node B to node C, and acquire skews of ⅛ of a clock cycle 920 and 922, respectively, in traveling from node C to node D. In this particular example, no retiming of the optical signal 910 and the optical-clock signal 908 is needed.

FIG. 10A shows an example transmission of information over the waveguide 302 of the system 500 from node C to node B in accordance with embodiments of the present invention. Directional arrows 1002-1004 identify the paths of an optical signal generated by node C and transmitted along the waveguide 302 to node B. FIG. 10B shows a timing diagram 1006 of the optical-clock signal 908 and an optical signal 1008 generated by node C. Directional arrows 1010-1012 correspond to paths 1002-1004, respectively. The timing diagram 1006 reveals that the optical signal 1008 acquires the same skew as the optical-clock signal 908 transmitted between nodes. In particular, the optical-clock signal 908 and the optical signal 1008 acquire skews of ⅛ of a clock cycle 1014 and 1016, respectively, in traveling from node C to node D. The optical-clock signal 908 and the optical signal 1008 acquire skews of ⅛ of a clock cycle 1018 and 1020, respectively, in traveling from node D to node A. The retimer 502 receives the optical-clock signal 908 and the optical signal 1008 and generates re-timed optical signal 1022 with the spacing in time T behind a rising clock edge 1024 of a new clock cycle 1026 so that the optical signal 1008 is behind a rising clock edge 1028 of the optical-clock signal 908 arriving at node A. In this particular example, retiming is needed only one time.

Figure 11A:
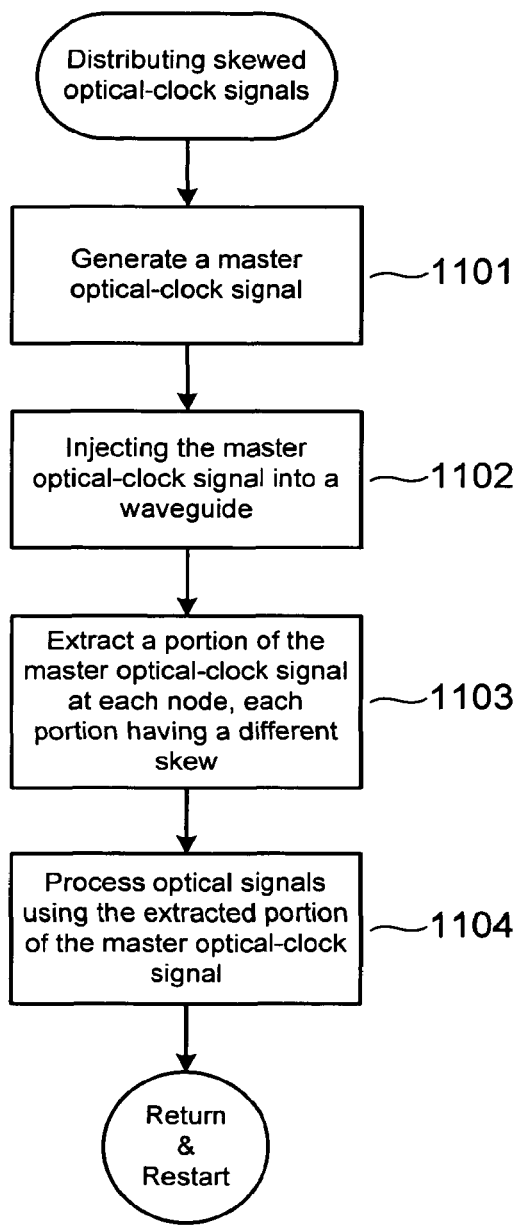
FIG. 11A shows a control-flow diagram of a method for processing optical signals using a skewed optical-clock signal in a source synchronous computer system in accordance with embodiments of the present invention.

FIG. 11A shows a control-flow diagram of a method for processing optical signals using a skewed optical-clock signal in a source synchronous computer system in accordance with embodiments of the present invention. In step 1101, a master optical-clock signal is generated, as described above (e.g. FIGS. 1 and 2A). In step 1102, the master optical-clock signal is injected into a waveguide, as described above. In step 1103, a portion of the master optical-clock signal is extracted at each node, each portion having a different skew for the respective node, as described above with reference to FIGS. 3B, 4B, 9B, and 10B. In step 1104, optical signals are processed internally at the node based on the portion of the master optical-clock signal having a different skew for the respective extracting node, as described above with reference to FIGS. 3B, 4B, 9B, and 10B. An example of processing optical signals using the portion of the master optical-clock signal having the different skew for the respective extracting node is reading the data in a received optical signal based on the extracted portion of the master optical-clock signal having the respective skew for the respective extracting node. Another example is transmitting data onto an optical signal in the waveguide by the respective extracting node based on the extracted portion of the master optical-clock signal having the respective skew for the respective extracting node wherein the transmitted optical signal has the equivalent time delay represented by the respective skew for the respective node in the extracted portion of the master optical-clock signal.

As discussed with respect to FIG. 1, one manner in which an extracting node can process internally optical signals based on the portion of the master optical-clock is that the respective extracting node generates a local electronic clock synchronous with the skewed extracted portion of the master optical-clock signal, reads data received on optical data signals using this locally generated clock, as well as transmits data onto optical data signals using the locally generated electronic clock.

Figure 11B:
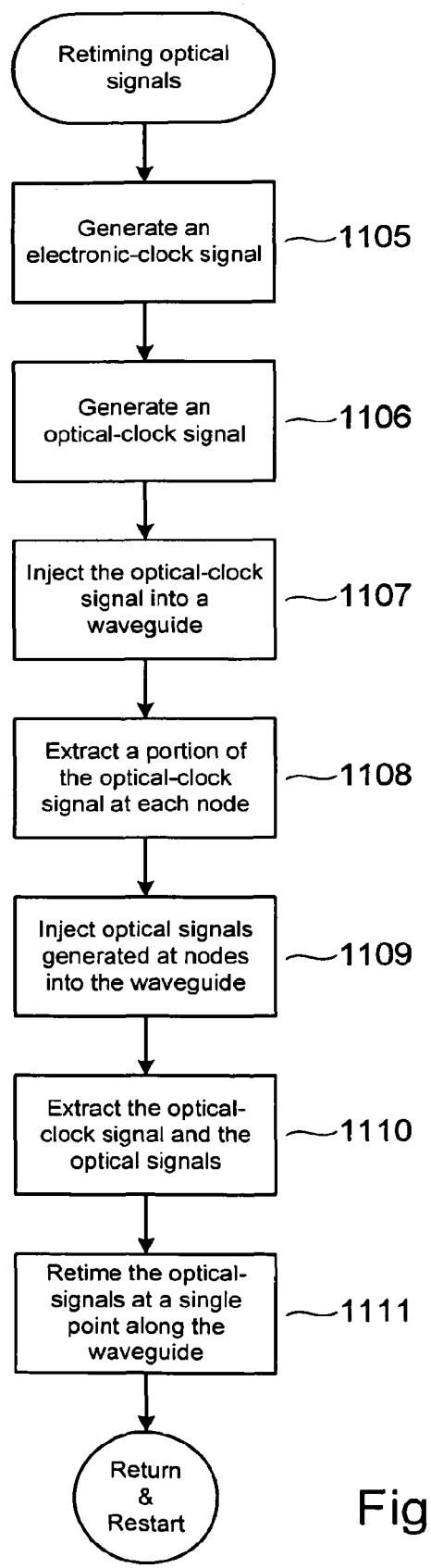
FIG. 11B shows a control-flow diagram of a method for retiming optical signals of a source synchronous system in accordance with embodiments of the present invention.

FIG. 11B shows a control-flow diagram of a method for retiming optical signals of a source synchronous system in accordance with embodiments of the present invention. In step 1105, an electronic-clock signal is generated using an electronic-system clock, as described above with reference to FIGS. 5B and 6A-6B. In step 1106, using the electronic-clock signal, an optical-clock signal is generated, as described above with reference to FIGS. 6A-8. In step 1107, the optical clock signal is injected into a waveguide that is optically coupled to a number of nodes, as described above with reference to FIGS. 6A-8. In step 1108, at least a portion of the optical-clock signal is extracted by each node to generate a local electronic-clock signal having the skew of the extracted portion of the master optical clock signal for use within each node for reading data and transmitting data onto optical signals so that they have the equivalent delay or skew as the master optical clock signal. In step 1109, the nodes inject optical signals destined for use within each node. In step 1110, the optical-clock signal and the optical signals are extracted by a retimer, as described above with reference to FIGS. 5B, 6A, 6B and 8. In step 1111, the optical signals are retimed based on the phase difference between a clock cycle of the optical-clock signal returning to the retimer and a clock cycle of the electronic-clock signal generated by the electronic-system clock. The retimer uses the phase difference to determine the time delay needed to re-time the optical signals so that the optical signals pass each node having the same respective skew as the master optical-clock signal has for each respective node.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A source synchronous system comprising:
a waveguide;
an optical-system clock optically coupled to the waveguide, the optical-system clock to generate and inject a master optical-clock signal into the waveguide, wherein a length of the waveguide is a whole integer multiple of a period of a clock cycle of the master optical-clock signal; and
a number of nodes optically coupled to the waveguide, wherein the master optical-clock signal acquires a skew as it passes between the nodes and each node extracts a portion of the master optical-clock signal and processes optical signals using the extracted portion of the master optical-clock signal having a respective skew for the respective extracting node.

2. The system of claim 1 wherein the waveguide further comprises a loop configuration having a length that is substantially equal to:

$$L = m\frac{c}{n}T_{CLK}$$

where L is the length of the waveguide, m is a whole number, c is the speed of light in free space, n is the refractive index of the waveguide, and $T_{CLK}$ is the period or time needed to complete one clock cycle of the optical-clock signal.

3. The system of claim 1 wherein each node processes the optical signals using the extracted portion of the master optical-clock signal having the respective skew for the respective extracting node further comprises the respective extracting node generating a local electronic clock synchronous with the skewed extracted portion of the master optical-clock signal, and the node reading data received on optical data signals and transmitting data onto optical data systems using the locally generated clock.

4. The system of claim 1 further comprising the optical signals are sent between nodes with the same skew as the master optical-clock signal.

5. The system of claim 1 further comprising a retimer disposed between two ends of the waveguide for retiming the optical signals, wherein the retimer determines the phase difference between a clock cycle of the optical-clock signal returning to the retimer and a clock cycle of an electronic-clock signal generated by an electronic-system clock of the retimer, and uses the phase difference to determine the time delay needed to re-time the optical signals so that the optical signals pass each node having the same skew as the master optical-clock signal.

6. The system of claim 5 wherein the retimer further comprises:
an optical-to-electrical converter configured to convert the optical-clock signal into electronic-clock signal and optical signals generated by the nodes into electronic signals;
an asynchronous device configured to delay the electronic-clock signal and the electronic signals; and
an electrical-to-optical converter electrically coupled to the asynchronous device and configured to convert the electronic-clock signal into an optical-clock signal and the electronic signals into optical signals.

7. The system of claim 6 wherein the asynchronous device further comprises one of:
a delay-lock loop for delaying the electronic signals;
memory configured to time delay the electronic signals by storing and retrieving the electronic signals in a first-in, first-out manner; and
an electronically tunable crystal composed of a material having a refractive index that can be varied in accordance with an appropriate amount of an applied voltage that delays the optical signals.

8. The system of claim 1 further comprising a second waveguide having substantially the same path as the waveguide and optically coupled to each node so that each node can transmit optical signals to other nodes that are optically coupled to the second waveguide using each nodes extracted portion of the master optical clock.

9. A method for processing optical signals using a skewed optical-clock signal in a source synchronous computer system, the method comprising:
generating a master optical-clock signal;
injecting the master optical-clock signal into a waveguide;
extracting a portion of the master optical-clock signal at each node optically coupled to the waveguide, the portion of the master optical-clock signal having a different skew at each node;
retiming the master optical-clock signal; and
processing optical signals at an extracting node using the portion of the master optical-clock signal having the respective skew for the extracting node.

10. The method of claim 9 wherein processing optical signals using the portion of the master optical-clock signal having the different skew for the respective extracting node further comprises
reading the data in a received optical signal based on the extracted portion of the master optical-clock signal having the respective skew for the respective extracting node; and
transmitting data onto an optical signal in the waveguide by the respective extracting node based on the extracted portion of the master optical-clock signal having the respective skew for the respective extracting node wherein the transmitted optical signal has the equivalent time delay represented by the respective skew for the respective node in the extracted portion of the master optical-clock signal.

11. The method of claim 9 wherein processing optical signals at an extracting node using the portion of the master optical-clock signal having the respective skew for the extracting node further comprises:
the respective extracting node generating a local electronic clock synchronous with the skewed extracted portion of the master optical-clock signal,
the node reading data received on optical data signals using the locally generated clock, and
the respective extracting node transmitting data onto optical data signals using the locally generated electronic clock.

12. The method of claim 9, wherein retiming the master clock signal includes retiming the optical signals at a single point along the waveguide so that each node receives the re-timed optical signals with the same skew as the master optical-clock signal.

13. The method of claim 12 wherein retiming the optical signals further comprises:
extracting the optical signals from the waveguide;
converting the optical signals into an electronic signals using an optical-to-electrical converter;
time delaying the electronic signal; and
converting the time delayed electronic signal into re-timed optical signals that are injected into the waveguide using an electrical-to-optical converter.

14. The method of claim 13 wherein time delaying the electronic signal further comprises determining an amount of time $T_{delay}$ by which to delay the optical signals in accordance with the following:

$$T_{delay} = n \cdot T_{CLK} - T_{return}$$

where $T_{CLK}$ is the period of one complete clock cycle, $T_{return}$ is the time for one clock cycle to complete a trip around the waveguide and return to the point at which the clock cycle was injected, and n is an integer satisfying the condition:

$$0 \leq (n \cdot T_{CLK} - T_{1\ CLK\ cycle}) \leq T_{return}$$

* * * * *

UNITED STATES PATENT AND TRADEMARK OFFICE
CERTIFICATE OF CORRECTION

PATENT NO.       : 8,543,005 B2
APPLICATION NO.  : 12/990494
DATED            : September 24, 2013
INVENTOR(S)      : Nathan L. Binkert et al.

Page 1 of 1

It is certified that error appears in the above-identified patent and that said Letters Patent is hereby corrected as shown below:

In the Claims:

In column 14, line 26, in Claim 14, delete "$0 \leq (n \cdot T_{CLK} - T_{1\ CLK\ cycle}) \leq T_{return}$" and insert -- $0 \leq (n \cdot T_{CLK} - T_{return}) \leq T_{return}$. --, therefor.

Signed and Sealed this
Twenty-seventh Day of May, 2014

Michelle K. Lee
*Deputy Director of the United States Patent and Trademark Office*